(12) United States Patent
Enders

(10) Patent No.: US 8,297,650 B2
(45) Date of Patent: Oct. 30, 2012

(54) INFLATABLE KNEE AIRBAG ASSEMBLIES WITH ARTICULATING HOUSINGS

(75) Inventor: Mark L. Enders, Pleasant View, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 12/872,946

(22) Filed: Aug. 31, 2010

(65) Prior Publication Data

US 2012/0049497 A1   Mar. 1, 2012

(51) Int. Cl.
*B60R 21/206* (2011.01)
(52) U.S. Cl. ..................... 280/730.1; 280/753
(58) Field of Classification Search ............... 280/728.2, 280/730.1, 752, 753
See application file for complete search history.

(56) References Cited

U.S. PATENT DOCUMENTS

| | | | |
|---|---|---|---|
| 3,858,822 A | 1/1975 | Wood | |
| 3,904,222 A | 9/1975 | Bursott et al. | |
| 3,966,227 A | 6/1976 | Cameron | |
| 4,290,627 A | 9/1981 | Cumming et al. | |
| 5,338,061 A | 8/1994 | Nelson et al. | |
| 5,344,184 A | 9/1994 | Keeler et al. | |
| 5,427,410 A | 6/1995 | Shiota et al. | |
| 5,460,400 A | 10/1995 | Davidson | |
| 5,529,337 A | 6/1996 | Takeda et al. | |
| 5,669,627 A | 9/1997 | Marjanski et al. | |
| 5,690,354 A * | 11/1997 | Logan et al. ............... | 280/728.2 |
| 5,765,867 A | 6/1998 | French | |
| 5,772,239 A | 6/1998 | Seymour | |
| 5,803,487 A | 9/1998 | Kikuchi et al. | |
| 5,810,390 A | 9/1998 | Enders et al. | |
| 5,823,566 A | 10/1998 | Manire | |
| 5,845,935 A | 12/1998 | Enders et al. | |
| 5,927,748 A | 7/1999 | O'Driscoll | |
| 6,010,147 A * | 1/2000 | Brown ...................... | 280/728.2 |
| 6,059,312 A | 5/2000 | Staub et al. | |
| 6,135,495 A * | 10/2000 | Redgrave et al. ............ | 280/732 |
| 6,155,595 A | 12/2000 | Schultz | |
| 6,213,496 B1 | 4/2001 | Minami et al. | |
| 6,217,059 B1 | 4/2001 | Brown et al. | |
| 6,224,129 B1 | 5/2001 | Cisternino et al. | |

(Continued)

FOREIGN PATENT DOCUMENTS

DE   20 2006 014 012   8/2006

(Continued)

OTHER PUBLICATIONS

Amendment and Response to Office Action filed Jun. 30, 2011 in co-pending U.S. Appl. No. 12/430,562, now published as U.S. Publication No. US 2010/0270775.

(Continued)

*Primary Examiner* — Joseph Rocca
(74) *Attorney, Agent, or Firm* — Sally J. Brown; Stoel Rives LLP

(57) ABSTRACT

An inflatable knee airbag is typically stored in a packaged state within an airbag housing. The housing often has a cover, which can be either a cosmetic cover or an unfinished cover, if the cover will not be readily visible to an occupant. During inflatable airbag deployment, the housing may contribute to determining the airbag's trajectory. A car-forward portion of an airbag housing that is horizontally oriented may rotate in a car-downward direction to allow a deployment trajectory of the deploying airbag to be more vertically oriented.

17 Claims, 12 Drawing Sheets

U.S. PATENT DOCUMENTS

| | | | |
|---|---|---|---|
| 6,254,121 B1 | 7/2001 | Fowler et al. | |
| 6,299,205 B1 | 10/2001 | Keshavaraj | |
| 6,364,348 B1 | 4/2002 | Jang et al. | |
| 6,431,583 B1 | 8/2002 | Schneider | |
| 6,454,296 B1 | 9/2002 | Tesch et al. | |
| 6,464,255 B1 | 10/2002 | Preisler et al. | |
| 6,474,686 B1 | 11/2002 | Higuchi et al. | |
| 6,494,484 B2 | 12/2002 | Bosgieter et al. | |
| 6,588,793 B2 * | 7/2003 | Rose | 280/728.2 |
| 6,631,920 B1 | 10/2003 | Webber et al. | |
| 6,655,711 B1 | 12/2003 | Labrie et al. | |
| 6,682,093 B2 | 1/2004 | Tajima et al. | |
| 6,685,217 B2 | 2/2004 | Abe | |
| 6,715,789 B2 | 4/2004 | Mizuno et al. | |
| 6,752,417 B2 | 6/2004 | Takimoto et al. | |
| 6,846,005 B2 | 1/2005 | Ford et al. | |
| 6,913,280 B2 * | 7/2005 | Dominissini et al. | 280/728.2 |
| 6,945,557 B2 | 9/2005 | Takimoto et al. | |
| 6,959,944 B2 | 11/2005 | Mori et al. | |
| 6,962,363 B2 | 11/2005 | Wang et al. | |
| 6,962,366 B2 | 11/2005 | Fukuda et al. | |
| 7,000,945 B2 * | 2/2006 | Bakhsh et al. | 280/730.1 |
| 7,000,947 B2 | 2/2006 | Kumagai et al. | |
| 7,029,026 B2 | 4/2006 | Morita | |
| 7,055,851 B2 | 6/2006 | Takimoto et al. | |
| 7,131,664 B1 | 11/2006 | Pang et al. | |
| 7,147,247 B2 | 12/2006 | Hayakawa | |
| 7,156,418 B2 | 1/2007 | Sato et al. | |
| 7,175,195 B2 | 2/2007 | Morita | |
| 7,182,365 B2 | 2/2007 | Takimoto et al. | |
| 7,185,912 B2 | 3/2007 | Matsuura et al. | |
| 7,195,275 B2 | 3/2007 | Abe | |
| 7,195,280 B2 | 3/2007 | Wheelwright et al. | |
| 7,201,396 B2 | 4/2007 | Takimoto et al. | |
| 7,226,077 B2 | 6/2007 | Abe | |
| 7,232,149 B2 | 6/2007 | Hotta et al. | |
| 7,261,318 B2 | 8/2007 | Enders | |
| 7,281,734 B2 | 10/2007 | Abe et al. | |
| 7,314,228 B2 | 1/2008 | Ishiguro et al. | |
| 7,314,230 B2 | 1/2008 | Kumagai et al. | |
| 7,347,444 B2 | 3/2008 | Wheelwright | |
| 7,370,881 B2 | 5/2008 | Takimoto et al. | |
| 7,374,201 B2 | 5/2008 | Chausset | |
| 7,374,202 B2 | 5/2008 | Lim | |
| 7,380,813 B2 | 6/2008 | Lanzinger et al. | |
| 7,384,065 B2 | 6/2008 | Takimoto et al. | |
| 7,387,311 B2 | 6/2008 | Kanno et al. | |
| 7,396,044 B2 | 7/2008 | Bauer et al. | |
| 7,434,837 B2 | 10/2008 | Hotta et al. | |
| 7,438,310 B2 | 10/2008 | Takimoto et al. | |
| 7,549,672 B2 | 6/2009 | Sato et al. | |
| 7,566,074 B2 | 7/2009 | Hawthorn et al. | |
| 7,568,724 B2 | 8/2009 | Kutchey et al. | |
| 7,568,730 B2 | 8/2009 | Kwon | |
| 7,631,894 B2 | 12/2009 | Hasebe et al. | |
| 7,641,223 B2 | 1/2010 | Knowlden | |
| 7,658,408 B2 | 2/2010 | Zofchak et al. | |
| 7,658,409 B2 | 2/2010 | Ford et al. | |
| 7,695,013 B2 | 4/2010 | Kakstis et al. | |
| 7,712,769 B2 | 5/2010 | Hasebe et al. | |
| 7,717,460 B2 | 5/2010 | Franke et al. | |
| 7,744,118 B2 | 6/2010 | Takimoto et al. | |
| 7,748,739 B2 | 7/2010 | Brinker | |
| 7,753,405 B2 | 7/2010 | Ishiguro et al. | |
| 7,753,407 B2 | 7/2010 | Yokota | |
| 7,766,374 B2 | 8/2010 | Abele et al. | |
| 7,793,973 B2 | 9/2010 | Sato et al. | |
| 7,798,517 B2 | 9/2010 | Ishida | |
| 7,819,419 B2 | 10/2010 | Hayashi et al. | |
| 7,878,540 B2 | 2/2011 | Takimoto et al. | |
| 8,083,254 B2 | 12/2011 | Enders et al. | |
| 8,118,325 B2 | 2/2012 | Enders et al. | |
| 2001/0007391 A1 | 7/2001 | Hamada et al. | |
| 2002/0044819 A1 | 4/2002 | Shamoon | |
| 2002/0149187 A1 | 10/2002 | Holtz et al. | |
| 2002/0171231 A1 | 11/2002 | Takimoto et al. | |
| 2002/0180187 A1 | 12/2002 | Hayashi | |
| 2003/0034637 A1 | 2/2003 | Wang et al. | |
| 2003/0209888 A1 | 11/2003 | Davis, Jr. et al. | |
| 2005/0001412 A1 | 1/2005 | Schneider et al. | |
| 2005/0057028 A1 | 3/2005 | Hayakawa | |
| 2005/0062265 A1 | 3/2005 | Hotta et al. | |
| 2005/0151351 A1 | 7/2005 | Enders et al. | |
| 2005/0194767 A1 | 9/2005 | Freisler et al. | |
| 2005/0194771 A1 | 9/2005 | Clark et al. | |
| 2005/0212275 A1 | 9/2005 | Hasebe | |
| 2005/0230939 A1 | 10/2005 | Abe et al. | |
| 2006/0279073 A1 | 12/2006 | Hotta et al. | |
| 2007/0057487 A1 | 3/2007 | Kim | |
| 2007/0120346 A1 | 5/2007 | Kwon | |
| 2007/0200321 A1 | 8/2007 | Heitplatz et al. | |
| 2007/0246920 A1 | 10/2007 | Abele et al. | |
| 2008/0157509 A1 | 7/2008 | Abe et al. | |
| 2008/0217892 A1 | 9/2008 | Maripudi et al. | |
| 2008/0238048 A1 | 10/2008 | Ishida | |
| 2009/0045607 A1 | 2/2009 | Fukuyama et al. | |
| 2009/0058048 A1 | 3/2009 | Ishida et al. | |
| 2009/0058052 A1 | 3/2009 | Ford et al. | |
| 2009/0085333 A1 | 4/2009 | Imaeda et al. | |
| 2009/0134611 A1 | 5/2009 | Wigger et al. | |
| 2009/0146400 A1 | 6/2009 | Knowlden | |
| 2009/0152842 A1 | 6/2009 | Benny et al. | |
| 2009/0152847 A1 | 6/2009 | Hong et al. | |
| 2009/0184498 A1 | 7/2009 | Takimoto et al. | |
| 2009/0212541 A1 | 8/2009 | Wallat et al. | |
| 2009/0242308 A1 * | 10/2009 | Kitte et al. | 180/271 |
| 2010/0025973 A1 * | 2/2010 | Jang et al. | 280/730.2 |
| 2010/0090445 A1 | 4/2010 | Williams et al. | |
| 2010/0270775 A1 | 10/2010 | Enders et al. | |
| 2010/0270779 A1 | 10/2010 | Enders et al. | |
| 2010/0270782 A1 | 10/2010 | Enders et al. | |
| 2011/0012327 A1 | 1/2011 | Enders | |
| 2011/0101660 A1 | 5/2011 | Schneider et al. | |
| 2011/0148077 A1 | 6/2011 | Enders | |
| 2012/0025496 A1 | 2/2012 | Schneider et al. | |
| 2012/0049488 A1 | 3/2012 | Enders | |

FOREIGN PATENT DOCUMENTS

| | | |
|---|---|---|
| DE | 10 2008 029810 | 12/2009 |
| WO | WO 02/04262 | 1/2002 |
| WO | WO 2010/126623 | 11/2010 |
| WO | WO-2011/008916 | 1/2011 |
| WO | WO-2011/056810 | 5/2011 |
| WO | WO-2011/079178 | 6/2011 |
| WO | WO-2012/030482 | 3/2012 |

OTHER PUBLICATIONS

Examiner's Interview Summary mailed Jul. 6, 2011 in co-pending U.S. Appl. No. 12/430,562, now published as U.S. Publication No. US 2010/0270775.

Notice of Allowance and Fee(s) Due mailed Aug. 23, 2011 in co-pending U.S. Appl. No. 12/430,562, now published as U.S. Publication No. US 2010/0270775.

Amendment and Response to Office Action filed Jul. 21, 2011 in co-pending U.S. Appl. No. 12/430,274, now published as U.S. Publication No. US 2010/0270779.

Amendment and Response to Office Action filed Apr. 28, 2011 in co-pending U.S. Appl. No. 12/430,246, now published as U.S. Publication No. US 2010/0270782.

Final Office Action mailed Jun. 24, 2011 in co-pending U.S. Appl. No. 12/430,246, now published as U.S. Publication No. US 2010/0270782.

Amendment and Response to Office Action filed Jun. 13, 2011 in co-pending U.S. Appl. No. 12/504,544, now published as U.S. Publication No. US 2011/0012327.

Final Office Action mailed Jun. 29, 2011 in co-pending U.S. Appl. No. 12/504,544, now published as U.S. Publication No. US 2011/0012327.

Examiner's Interview Summary mailed Jul. 7, 2011 in co-pending U.S. Appl. No. 12/504,544, now published as U.S. Publication No. US 2011/0012327.

Restriction Requirement mailed Sep. 15, 2010 in co-pending U.S. Appl. No. 12/430,246.

Amendment and Response to Requirement for Election of Species filed Oct. 12, 2010 in co-pending U.S. Appl. No. 12/430,246.
Preliminary Amendment filed Aug. 31, 2009 in co-pending U.S. Appl. No. 12/504,544.
Preliminary Amendment filed Jul. 15, 2010 in co-pending U.S. Appl. No. 12/504,544.
Notification of Transmittal of the International Search Report and the Written Opinion of the International Searching Authority mailed Mar. 30, 2010 in International Application No. PCT/US2010/021343.
Notification of Transmittal of the International Search Report and the Written Opinion of the International Searching Authority mailed Sep. 23, 2010 in International Application No. PCT/US2010/042070.
Co-pending U.S. Appl. No. 12/430,562, titled Knee Airbag Assemblies Configured for Inflator Insertion and Inflator-Mediated Coupling to an Airbag Housing, filed Apr. 27, 2009.
Co-pending U.S. Appl. No. 12/430,274, titled Inflatable Knee Airbags and Internal Tethers Produced From Single Panels of Material, filed Apr. 27, 2009.
Co-pending U.S. Appl. No. 12/430,246, titled Inflatable Knee Airbags Assemblies With Bag Straps for Wrapping the Airbags and Optimizing Deployment, filed Apr. 27, 2009.
Co-pending U.S. Appl. No. 12/645,130, titled Inflatable Airbag Assembly With an Integral Cover, filed Dec. 22, 2009.
Co-pending U.S. Appl. No. 12/504,544, titled Inflatable Knee Airbag Having Two Chambers Separated by an Internal Tether, filed Jul. 16, 2009.
Co-pending U.S. Appl. No. 12/611,676, titled Low-Mount Inflatable Knee Airbags Having Serial Chambers, filed Nov. 3, 2009.
Co-pending U.S. Appl. No. 12/872,323, titled Covers for Inflatable Knee Airbag Housings, filed Aug. 31, 2010.
Office Action mailed Oct. 29, 2010 in co-pending U.S. Appl. No. 12/430,246, now publiched as U.S. Publication No. US 2010/0270782.
Notification of Transmittal of the International Search Report and the Written Opinion of the International Searching Authority mailed Jan. 3, 2011 in International Application No. PCT/US2010/055197.
Restriction and/or Election Requirement mailed Jan. 20, 2011 in co-pending U.S. Appl. No. 12/430,562, now published as U.S. Publication No. US 2010/0270775.
Amendment and Response to Requirement of Election of Species filed Feb. 22, 2011 in co-pending U.S. Appl. No. 12/430,562, now published as U.S. Publication No. US 2010/0270775.
Office Action mailed Mar. 30, 2011 in co-pending U.S. Appl. No. 12/430,562, now published as U.S. Publication No. US 2010/0270775.

Office Action mailed Jan. 21, 2011 in co-pending U.S. Appl. No. 12/430,274, now published as U.S. Publication No. US 2010/0270779.
Office Action mailed Dec. 13, 2010 in co-pending U.S. Appl. No. 12/504,544, now published as U.S. Publication No. US 2011/0012327.
Notification of Transmittal of the International Search Report and the Written Opinion of the International Searching Authority mailed Feb. 18, 2011 in International Application No. PCT/US2010/061744.
Notice of Allowance and Fee(s) Due mailed Oct. 18, 2011 in co-pending U.S. Appl. No. 12/430,274, now published as U.S. Publication No. US 2010/0270779.
Amendment and Response After Final filed Aug. 29, 2011 in co-pending U.S. Appl. No. 12/504,544, now published as U.S. Publication No. US 2011/0012327.
Advisory Action mailed Sep. 9, 2011 in co-pending U.S. Appl. No. 12/504,544, now published as U.S. Publication No. US 2011/0012327.
Request for Continued Examination filed Oct. 6, 2011 in co-pending U.S. Appl. No. 12/504,544, now published as U.S. Publication No. US 2011/0012327.
Office Action mailed Dec. 1, 2011 in co-pending U.S. Appl. No. 12/504,544, now published as U.S. Publication No. US 2011/0012327.
Restriction Requirement mailed Dec. 14, 2011 in co-pending U.S. Appl. No. 12/611,676, now published as U.S. Publication No. US 2011/0101660.
Co-pending U.S. Appl. No. 13/270,462, titled Knee Airbag Assemblies and Related Methods, filed Oct. 11, 2011.
Co-pending U.S. Appl. No. 13/290,856, titled Knee Airbag Folding Patterns and Assemblies and Related Methods, filed Nov. 7, 2011.
Restriction Requirement mailed Jan. 20, 2010 in co-pending U.S. Appl. No. 12/645,130, now published as U.S. Publication No. US 2011/0148077.
Amendment and Response to Restriction Requirement filed Jan. 17, 2012 in co-pending U.S. Appl. No. 12/611,676, now published as U.S. Publication No. US 2011/0101660.
Notification of Transmittal of the International Search Report and the Written Opinion of the International Searching Authority mailed Jan. 26, 2012 in International Application No. PCT/US2011/046952.
Non-Final Office Action mailed Mar. 8, 2012 in co-pending U.S. Appl. No. 12/611,686, now published as U.S. Publication No. US 2011/0101660.
Non-Final Office Action mailed Mar. 12, 2012 in co-pending U.S. Appl. No. 12/872,323, now published as U.S. Appl. No. US 2012/0049488.

* cited by examiner

INFLATABLE KNEE AIRBAG ASSEMBLIES WITH ARTICULATING HOUSINGS

TECHNICAL FIELD

The present disclosure relates generally to the field of automotive protective systems. More specifically, the present disclosure relates to housings for inflatable knee airbag assemblies.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered to be limiting of the disclosure's scope, the embodiments will be described and explained with specificity and detail in reference to the accompanying drawings.

DETAILED DESCRIPTION OF PREFERRED EMBODIMENTS

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

The phrases "connected to," "coupled to" and "in communication with" refer to any form of interaction between two or more entities, including mechanical, electrical, magnetic, electromagnetic, fluid, and thermal interaction. Two components may be coupled to each other even though they are not in direct contact with each other. The term "abutting" refers to items that are in direct physical contact with each other, although the items may not necessarily be attached together.

Inflatable airbag systems are widely used to minimize occupant injury in a collision scenario. Airbag modules have been installed at various locations within a vehicle, including, but not limited to, the steering wheel, the instrument panel, within the side doors or side seats, adjacent to roof rail of the vehicle, in an overhead position, or at the knee or leg position. In the following disclosure, "airbag" may refer to an inflatable curtain airbag, overhead airbag, front airbag, or any other airbag type.

During installation, the airbags are rolled, folded, or both, and are retained in the packaged configuration behind a cover. During a collision event, vehicle sensors trigger the activation of an inflator, which rapidly fills the airbag with inflation gas. Thus the airbag rapidly changes conformations from the packaged configuration to an expanded configuration.

Figure 1A:
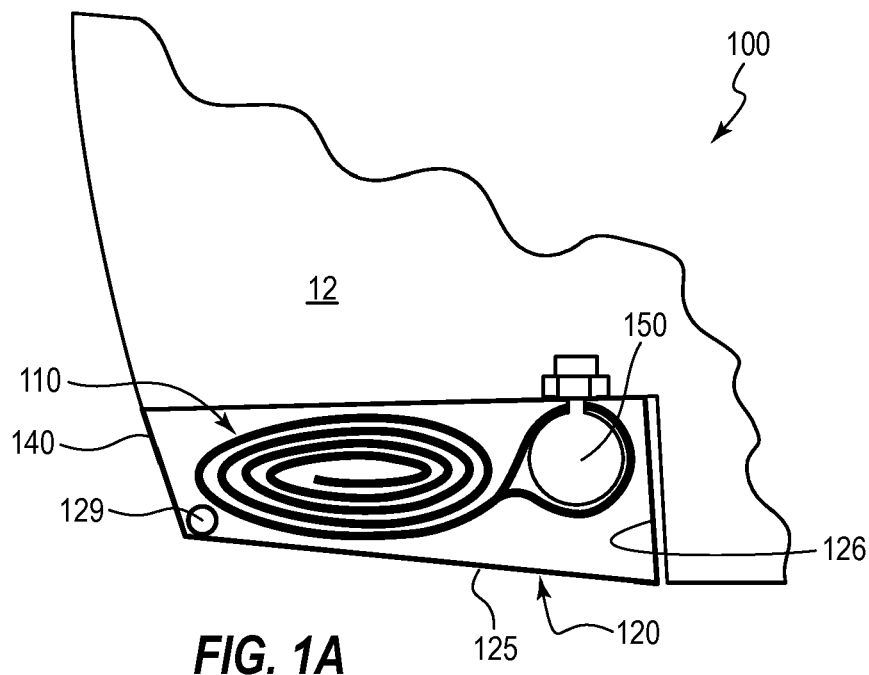
FIG. 1A is a side elevation view of an airbag assembly 100, wherein the assembly is in a packaged state and is located in a low-mount position under a knee bolster of a vehicle.
Figure 1B:
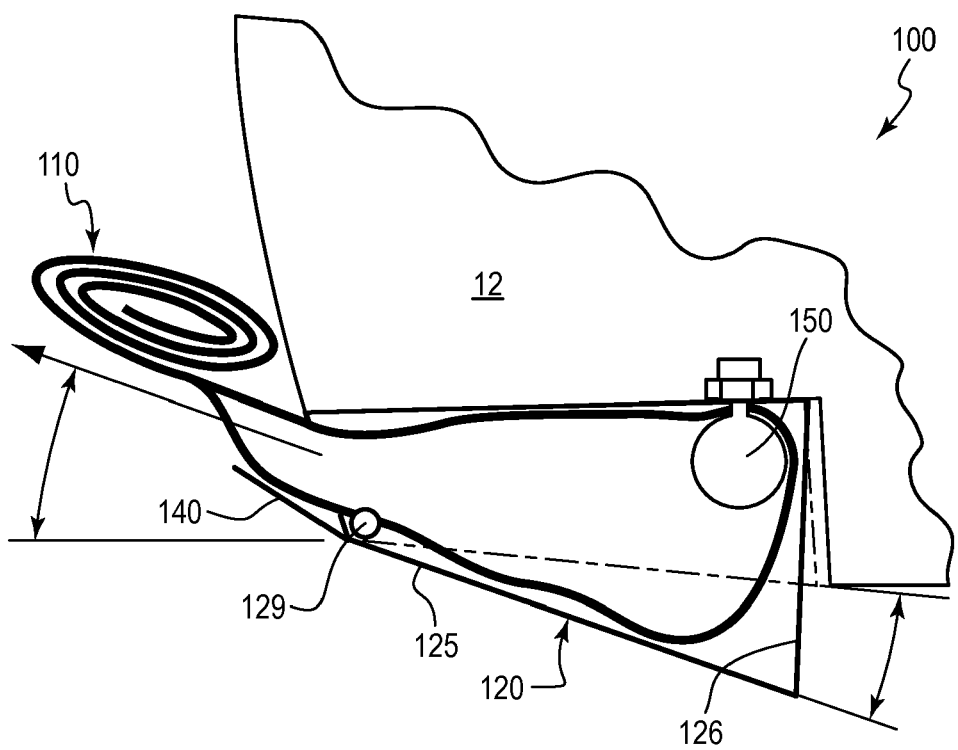
FIG. 1B is a side elevation view of the airbag assembly of FIG. 1A after the airbag has begun to be deployed.

FIGS. 1A-1B depict side views of an airbag assembly 100, wherein the airbag assembly is in a low-mount position under a knee bolster 12 of a vehicle. Airbag assembly 100 may comprise an inflatable airbag 110, an inflatable airbag housing 120, a cover 140, and an inflator 150. Airbag 110 is coupled to inflator 150 and housing 120, such that the inflator can inflate the airbag. Housing 120 may comprise a car-downward portion 125, a car-forward wall 126, and a hinge 129. In the depicted embodiment, hinge 129 comprises a mechanical hinge; however, in other embodiments the hinge may comprise a living hinge. Cover 140 may be rotatably coupled to a car-rearward opening of housing 120. Cover 140 may not rotate about hinge 129. In the depicted embodiment, cover 140 is flush with a car-rearward surface of knee bolster 12; however, in other embodiments, the airbag assembly may lack a cosmetic cover, and/or the cover may be recessed from the knee bolster.

FIG. 1A depicts airbag assembly in a packaged configuration, wherein housing 120 is in a contracted configuration. Housing 120 may also be said to be in the packaged configuration, an undeployed configuration, an unexpanded configuration, or an unrotated configuration. In FIG. 1B, car-downward portion 125 has rotated about hinge 129, such that car-forward wall 126 has expanded. Cover 140 has been forced open by pressure from expansion of airbag 110. As a result of the articulation of housing 120, an initial deployment trajectory of airbag 110 is in a more car-upward and car-rearward direction than if housing 120 did not articulate.

Figure 2A:
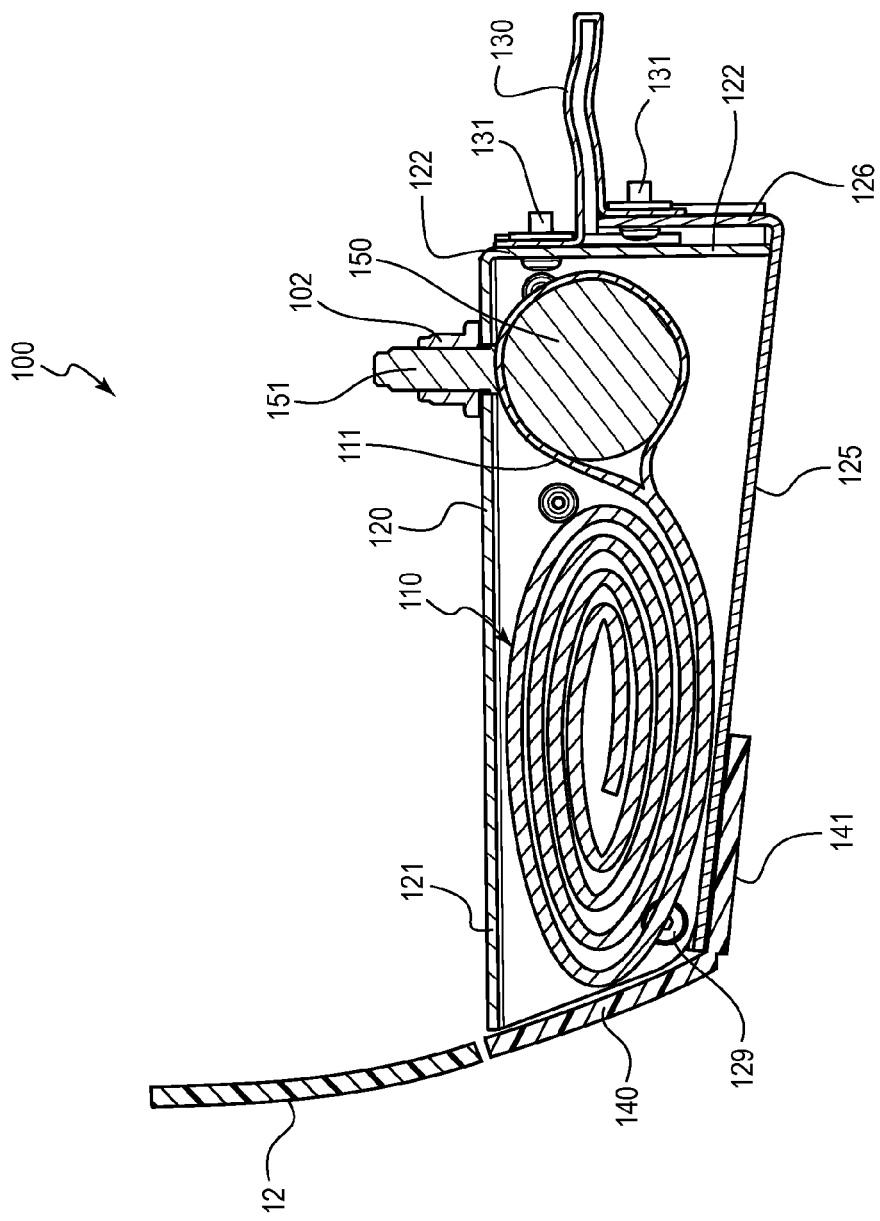
FIG. 2A is a cross-sectional view of the airbag assembly of FIGS. 1A-1B, wherein the airbag assembly is in the packaged configuration.
Figure 2B:
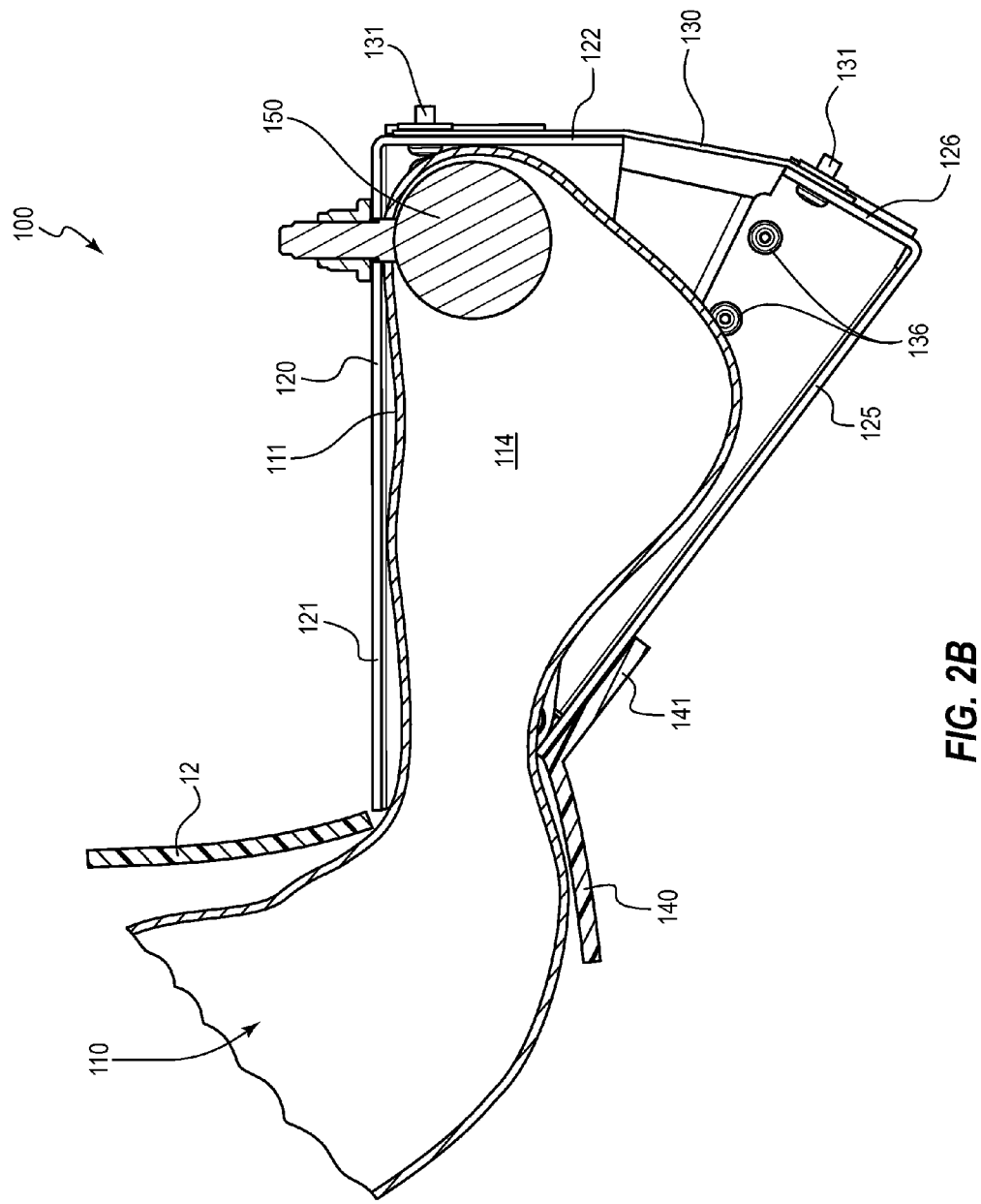
FIG. 2B is a cross-sectional view of the airbag assembly of FIG. 2A, wherein the assembly is in a deployed configuration.

FIGS. 2A-2B depict cross-sectional views of airbag assembly 100 of FIGS. 1A-1B, wherein more details can be appreciated in the views of FIGS. 2A-2B. Assembly 100 is depicted in a low-mount position below knee bolster 12. Cover 140 is configured to block the car-rearward opening of housing 120, such that airbag 110 is retained within a void of the housing. An optional lower cover 141 may be employed in some embodiments. Inflator 150 may be coupled to airbag 110 and car-upward portion 121 of housing 120 via at least one inflator mounting stem 151. Inflator mounting stem 151 may be coupled to housing 120 via mounting hardware 102, which in the depicted embodiment comprises a threaded nut.

Car-upward portion 121 and car-downward portion 125 each comprise car-forward walls 122 and 126, which are configured such that they can move independently of each other within a predetermined range, when the car-downward portion of housing 120 rotates about hinge 129. A car-forward tether 130 may be coupled to each car-forward wall 122 and 126 using tether mounting hardware 131. Car-forward tether 130 may comprise a flexible member, such as fabric or plastic, such that the tether allows the housing to adopt the contracted and expanded configurations.

Figure 3A:
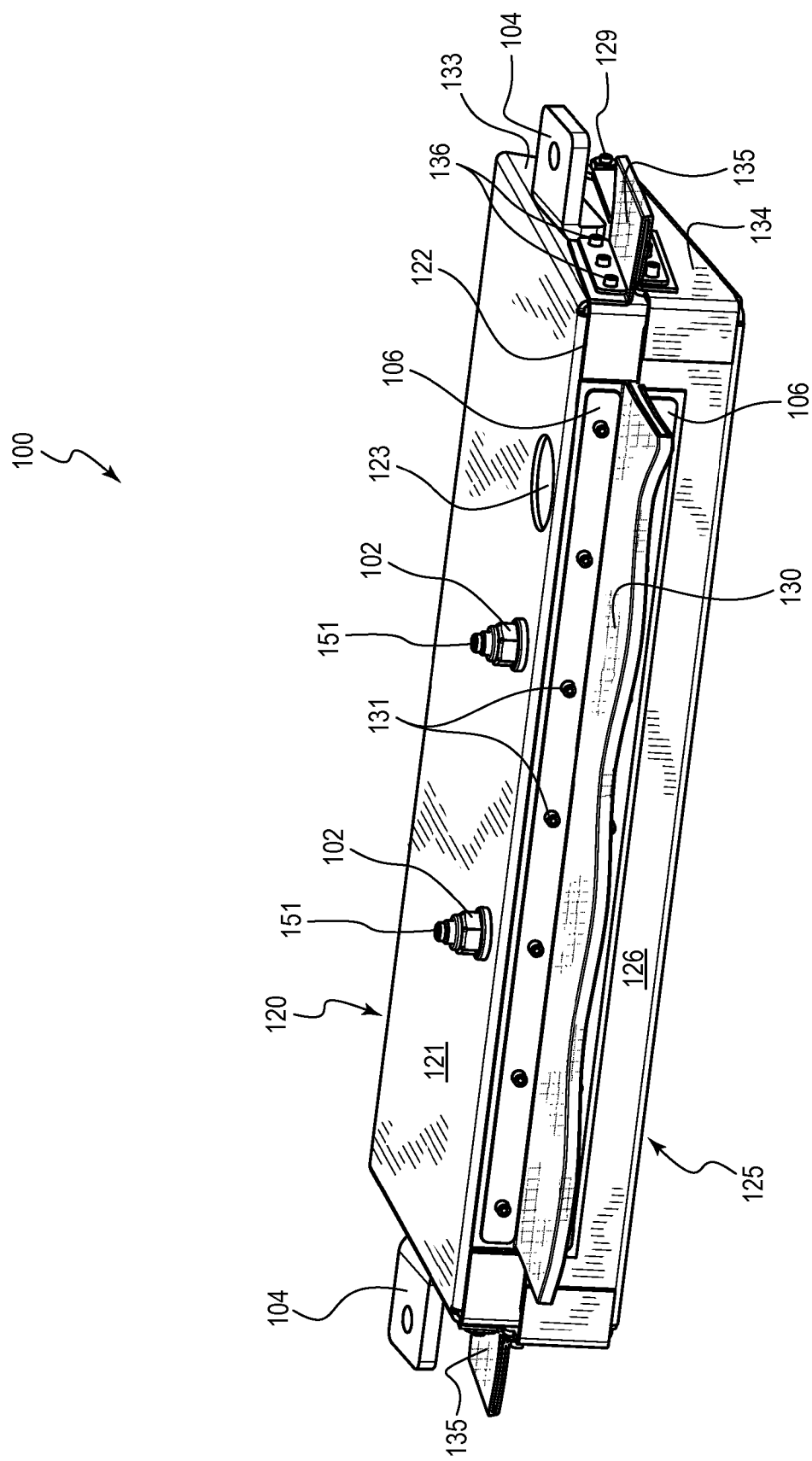
FIG. 3A is a rear perspective view of the airbag housing shown in FIGS. 2A-2B, wherein the housing is in a packaged configuration
Figure 3B:
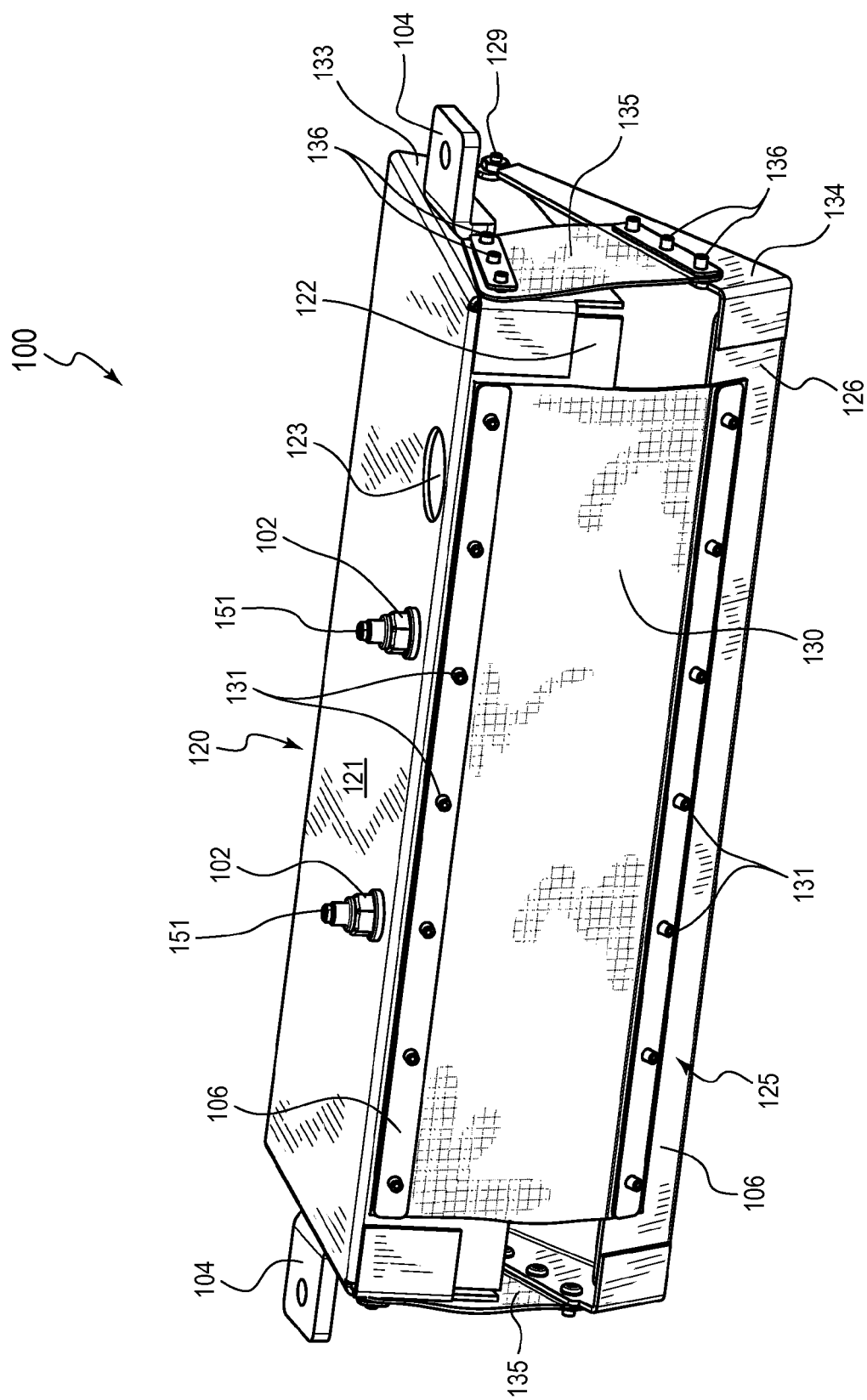
FIG. 3B is a rear perspective view of the airbag housing shown in FIG. 3A, wherein the housing is in the deployed configuration.

In FIG. 2A, assembly 100 is in the packaged configuration, wherein housing 120 is in the contracted configuration. When housing 120 is in the contracted configuration, car-forward tether 130 is in a slack state. In FIG. 2B, assembly 100 is in the deployed and inflated configuration, wherein housing 120 is in the expanded configuration. Upon receiving electronic communication from vehicle sensors, inflator 150 may release and/or produce inflation gas into an inflatable void 114, which may begin to inflate a throat portion 111 of airbag 110. Pressure from inflation gas may act on car-downward portion 125 of housing 120, and thereby cause the car-downward portion of the housing to rotate about the hinge, which causes car-forward wall 126 to rotate in the car-downward direction. Car-forward wall 126 may continue to rotate downward until stopped by car-forward tether 130 and/or side tether 135, which is shown In FIGS. 3A-3B. Housing 120 may comprise one or more side tethers 135, which may be coupled to sidewalls of car-upward and car-downward portions 121 and 125 of the housing via side tether mounting structures 136. Side tethers 135 may comprise a fabric.

As will be appreciated by those skilled in the art, a variety of types and configurations of airbag housings can be utilized without departing from the scope and spirit of the present disclosure. For example, the size, shape, and proportions of the housing may vary from the depicted embodiment. One skilled in the art will also appreciate that the airbag housing may comprise a variety of materials or combinations of materials. For example, the housing may comprise metal, plastic, or composite materials.

As will be appreciated by those skilled in the art, a variety of types and configurations of inflatable knee airbags can be utilized without departing from the scope and spirit of the present disclosure. For example, the size, shape, and proportions of the airbag cushion may vary according to its use in different vehicles or different locations within a vehicle such that the airbag may comprise an inflatable curtain cushion; a rear passenger side airbag; a driver's airbag; a knee airbag; and/or a front passenger airbag. Also, the airbag may comprise one or more of any material well known in the art, such as a woven nylon fabric, which may be coated with a substance, such as silicone. Additionally, the airbag cushion may be manufactured using a variety of techniques such as one piece weaving, cut and sew, or a combination of the two techniques. Further, the cushion membrane may be manufactured using sealed or unsealed seams, wherein the seams are formed by stitching, adhesive, taping, radio frequency welding, heat sealing, or any other suitable technique or combination of techniques.

FIGS. 3A-3B are perspective views of a portion of airbag assembly 100. In FIG. 3A, housing 120 is in the contracted configuration, and in FIG. 3B, the housing is in the expanded configuration. Housing 120 may comprise car-upward portion 121, car-forward wall 122 of upward portion 121, an inflator connection aperture 123, car-downward portion 125, car-forward wall 126, hinge 129, car-forward tether 130, tether mounting hardware 131, sidewall 133 of car-upward portion 121, sidewall 134 of car-downward portion 125, a plurality of side tethers 135, and side tether mounting hardware 136. Mounting tabs 104 may be coupled to housing 120, wherein the mounting tabs may be employed to couple the housing to a vehicle structure. Inflator mounting stems 151 protrude through apertures in car-upward portion 121 of airbag housing 120, and may be coupled to the airbag housing via mounting hardware 102.

Figure 4:
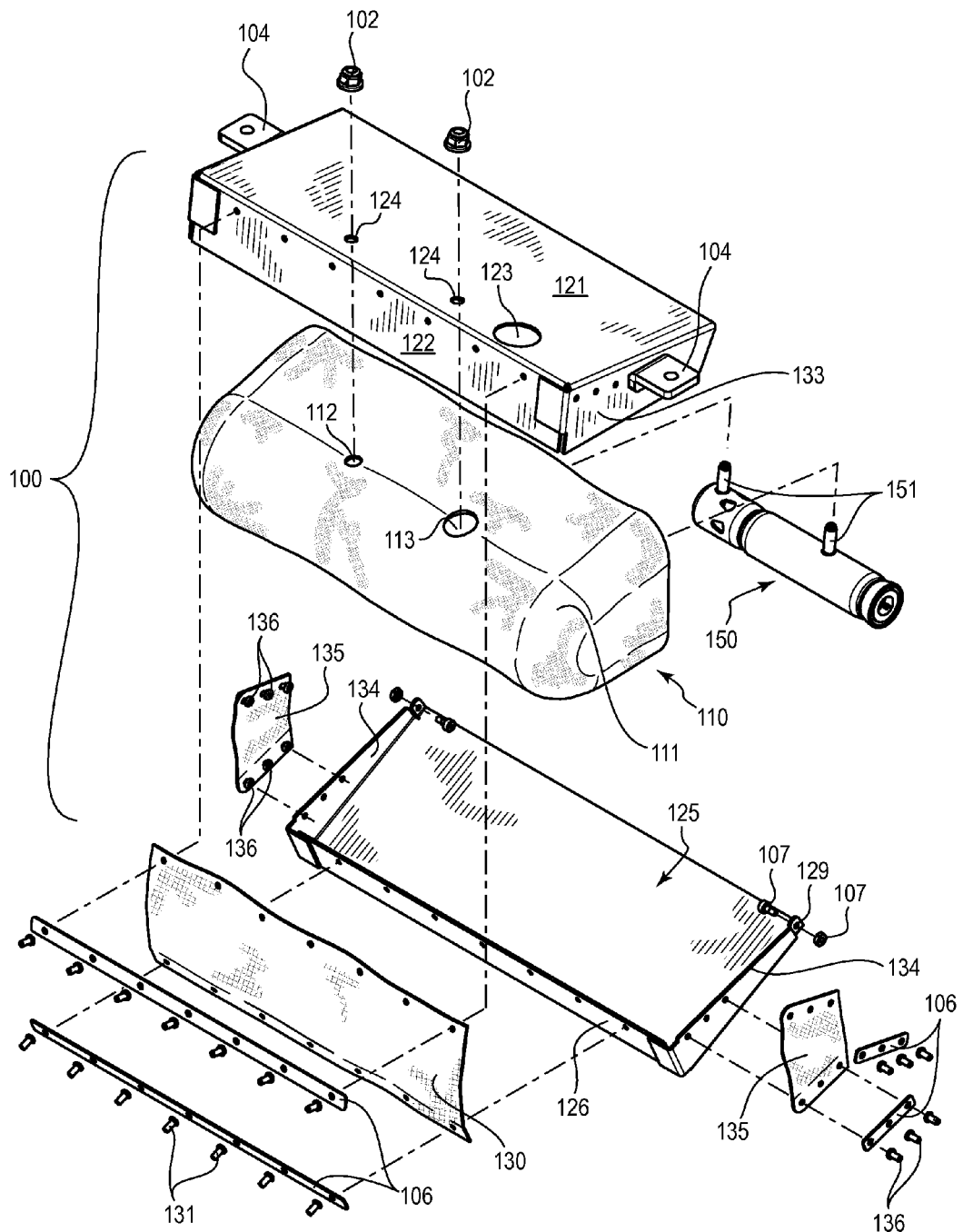
FIG. 4 is an exploded perspective view of the airbag assembly shown in FIGS. 1A-2B.

FIG. 4 is an exploded perspective view of airbag assembly 100. Assembly 100 may comprise airbag 110, housing 120, and inflator 150. Airbag 110 comprises throat portion 111, inflator inset aperture 113, and inflator mounting stem aperture 112. Housing 120 may comprise car-upward portion 121, car-forward wall 122 of upward portion 121, an inflator connection aperture 123, a plurality of inflator mounting stem apertures 124, car-downward portion 125, car-forward wall 126, hinge 129, hinge hardware 107, car-forward tether 130, tether mounting hardware 131, sidewall 133 of car-upward portion 121, sidewall 134 of car-downward portion 125, a plurality of side tethers 135, and side tether mounting hardware 136. Tethers 130 and 135 may be coupled to housing 120 via mounting brackets 106. Mounting tabs 104 may be coupled to housing 120, wherein the mounting tabs may be employed to couple the housing to a vehicle structure. Inflator 150 is configured to be partially inserted into inflator insert aperture 113 of housing 110, such that inflator mounting stems 151 protrude through the airbag apertures 112 and 113 and also protrude through apertures 124 of car-upward portion 121. Mounting hardware 102 may be employed to secure inflator 150 and airbag 110 to housing 120.

FIGS. 5A-7 depict another embodiment of an inflatable airbag assembly 200 with an articulating housing 220, wherein assembly 200 and housing 220 resemble assembly 100 and housing 120, described above, in certain respects. Accordingly, like features may be designated with like reference numerals, with the leading hundreds numeral incremented from "1" to "2." Any suitable combination of the features described with respect to assembly 100 can be employed with assembly 200, and vice versa.

Figure 5A:
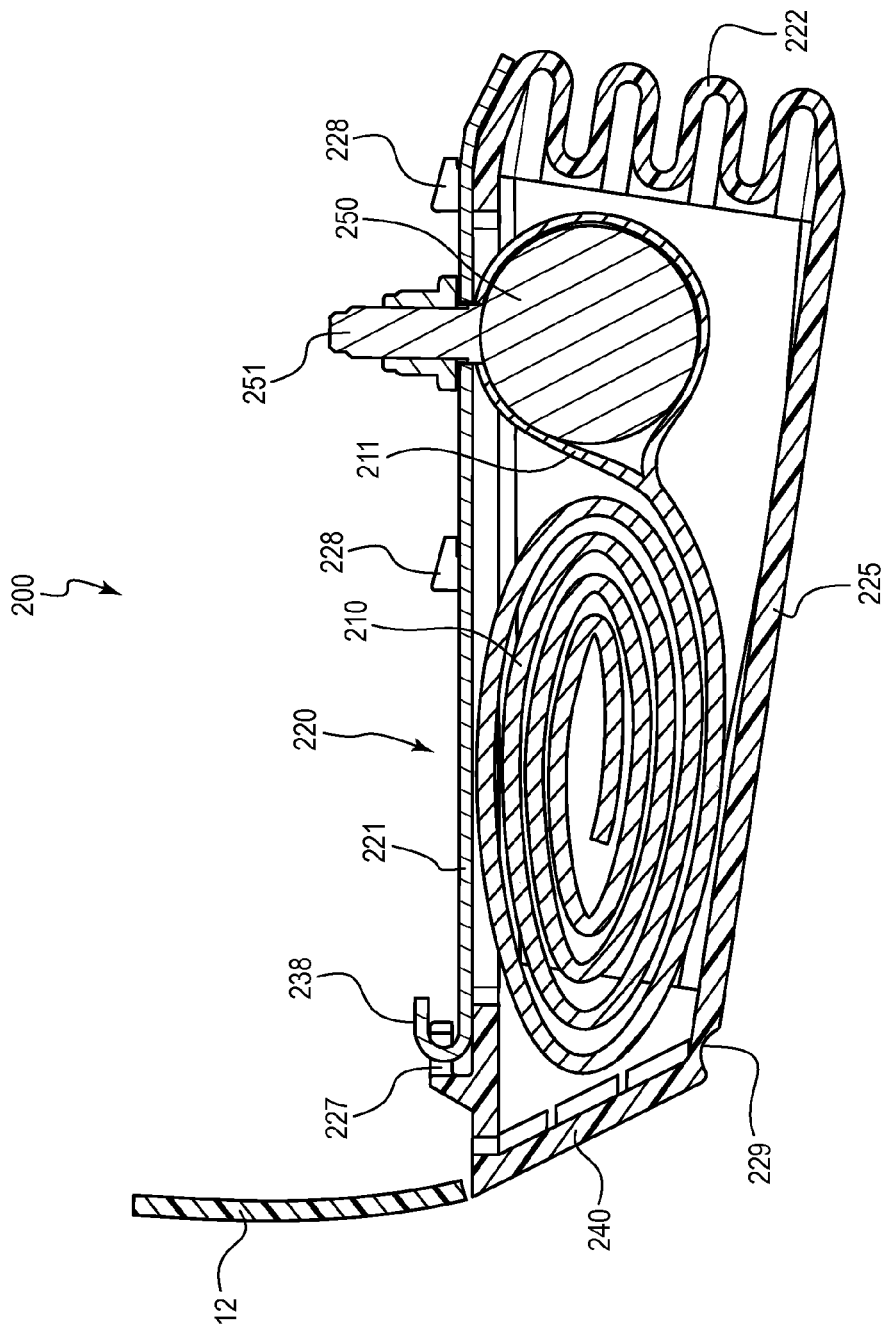
FIG. 5A is a cross-sectional view of another embodiment of an inflatable airbag assembly, wherein the assembly is in a packaged configuration.

FIG. 5A depict cross-sectional views of airbag assembly 200 Assembly 200 is depicted in a low-mount position below knee bolster 12. Assembly 200 may comprise an inflatable airbag 210, a housing 220, a cover 240, and an inflator 250. Cover 240 may comprise an extension of housing 220, or may comprise a separate piece that is attached to housing 220. Cover 240 is configured to block the car-rearward opening of housing 220, such that airbag 210 is retained within a void of the housing.

Housing 220 may comprise a car-upward portion 221, a car-forward wall 222, a car-downward portion 225, a plurality of apertures 227, a plurality of extensions 228, and a hinge region 229. Car-downward portion 225 may also be called a car-downward wall of the car-downward portion. Car-upward portion 221 may comprise a reaction plate that may comprise a rigid member. In some embodiments, the reaction plate may comprise a piece of metal. Reaction plate 221 may comprise a plurality of extensions 238, which are depicted as "hooks" 238. Hooks 238 are configured to be received by apertures 227, which may be called "windows." In some embodiments, an entirety of the airbag housing may be described as being flexible, and may comprise plastic. In the depicted embodiment, an entirety of housing 220 comprises plastic, except reaction plate 221. Car-forward wall 222 of housing 220 comprises a plurality of folds, undulations, or ribs, which may also be described as accordion folds. Inflator 250 may be coupled to airbag 210 and reaction plate 221 of housing 220 via at least one inflator mounting stem 251 and mounting hardware, such as a threaded nut.

Figure 5B:
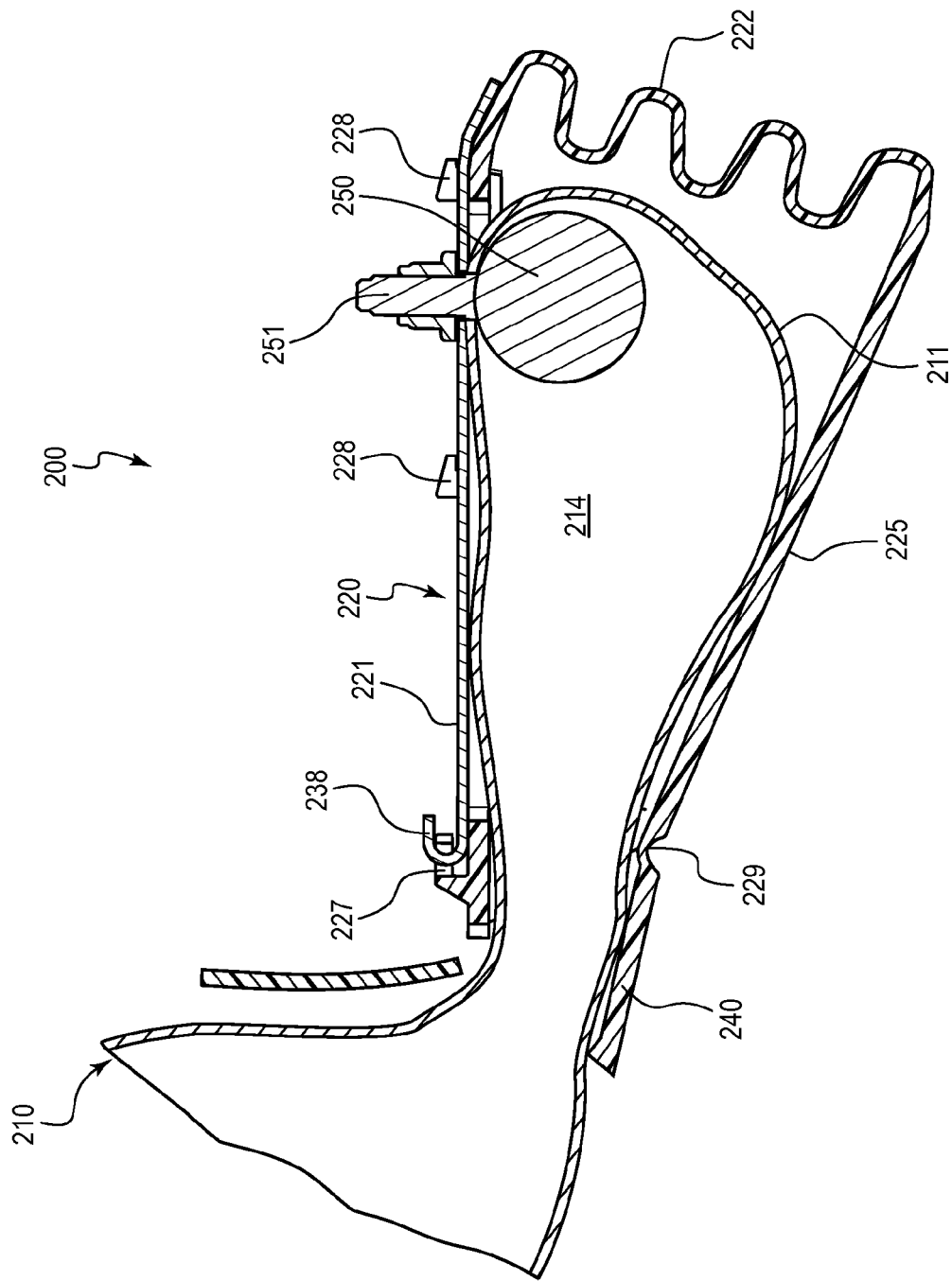
FIG. 5B is a cross-sectional view of the airbag assembly of FIG. 5A, wherein the assembly is in a deployed configuration.

In FIG. 5A, assembly 200 is in a packaged configuration, wherein housing 220 is in a contracted configuration. In FIG. 5B, assembly 200 is in the deployed and inflated configuration, wherein housing 220 is in the expanded configuration.

Upon receiving electronic communication from vehicle sensors, inflator 250 may release and/or produce inflation gas into an inflatable void 214, which may begin to inflate a throat portion 211 of airbag 210. Pressure from inflation gas may act on car-downward portion 225 of housing 220, and thereby cause the car-downward wall of the car-downward portion of the housing to rotate about hinge region 229, which causes the accordion folds of car-forward wall 222 to expand. Hinge region 229 may not comprise a mechanical hinge, but rather, may comprise a living hinge. Further hinge region 229 may not comprise a specific location about which car-downward portion 225 rotates. Rather, housing 220 may generally flex at any of the car-rearward areas of the housing.

Figure 6:
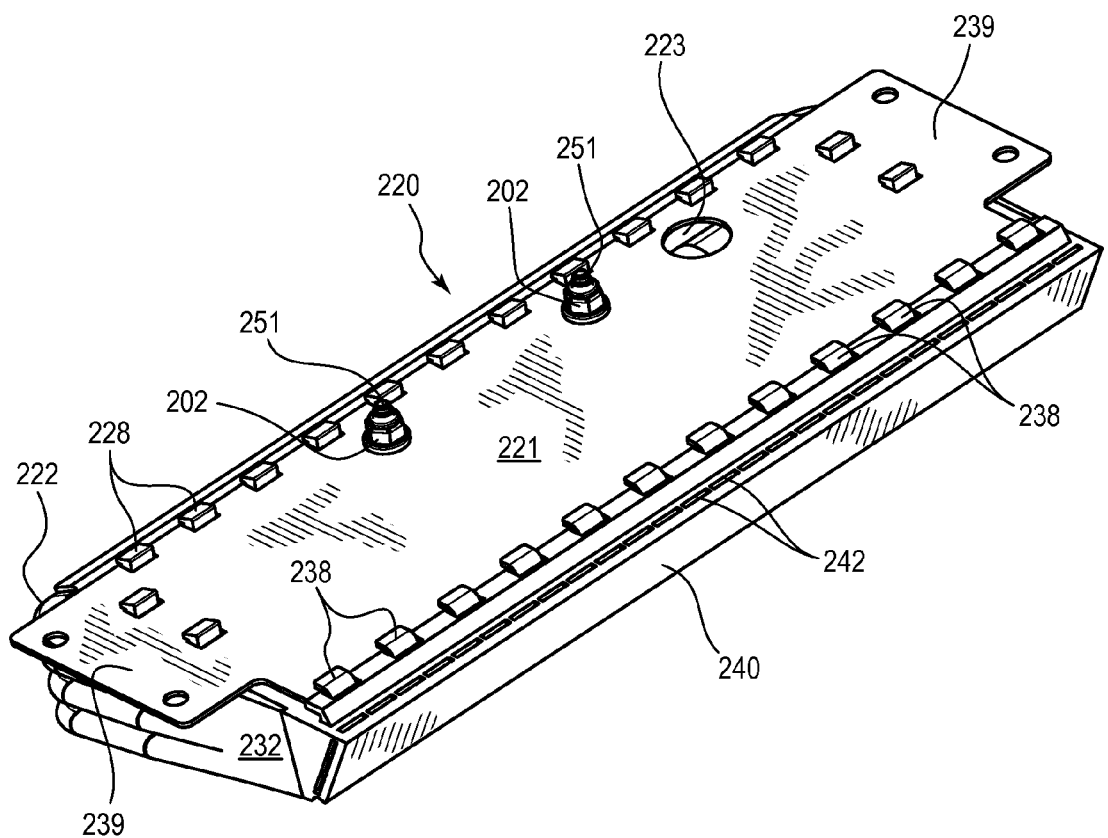
FIG. 6 is a top perspective view of the airbag assembly shown in FIGS. 5A-5B.

FIG. 6 is a perspective view of airbag housing 220, wherein the housing is in the constricted configuration. Housing 220 may comprise reaction plate 221, which may comprise an aperture 223 for connecting the inflator, a plurality of hooks 238, and flanges 239. Flanges 239 may be employed to help couple airbag housing 220 to a vehicle structure. Inflator mounting stems 251 may protrude through reaction plate 221, and the mounting stems may be secured to the plate via nuts 202. Housing 220 further comprises a car-forward wall 222 and two lateral sidewalls 232. Lateral sidewalls 232 may be called side portions. Walls 222 and 232 may each at least partially comprise plurality of folds, such as accordion folds. Housing 220 may further comprise cover 240, which may have a tear seam 242 that in the depicted embodiment comprises perforations. Hooks 228 of housing 220 may protrude through windows in reaction plate 221 to help secure the reaction plate to the housing.

Figure 7:
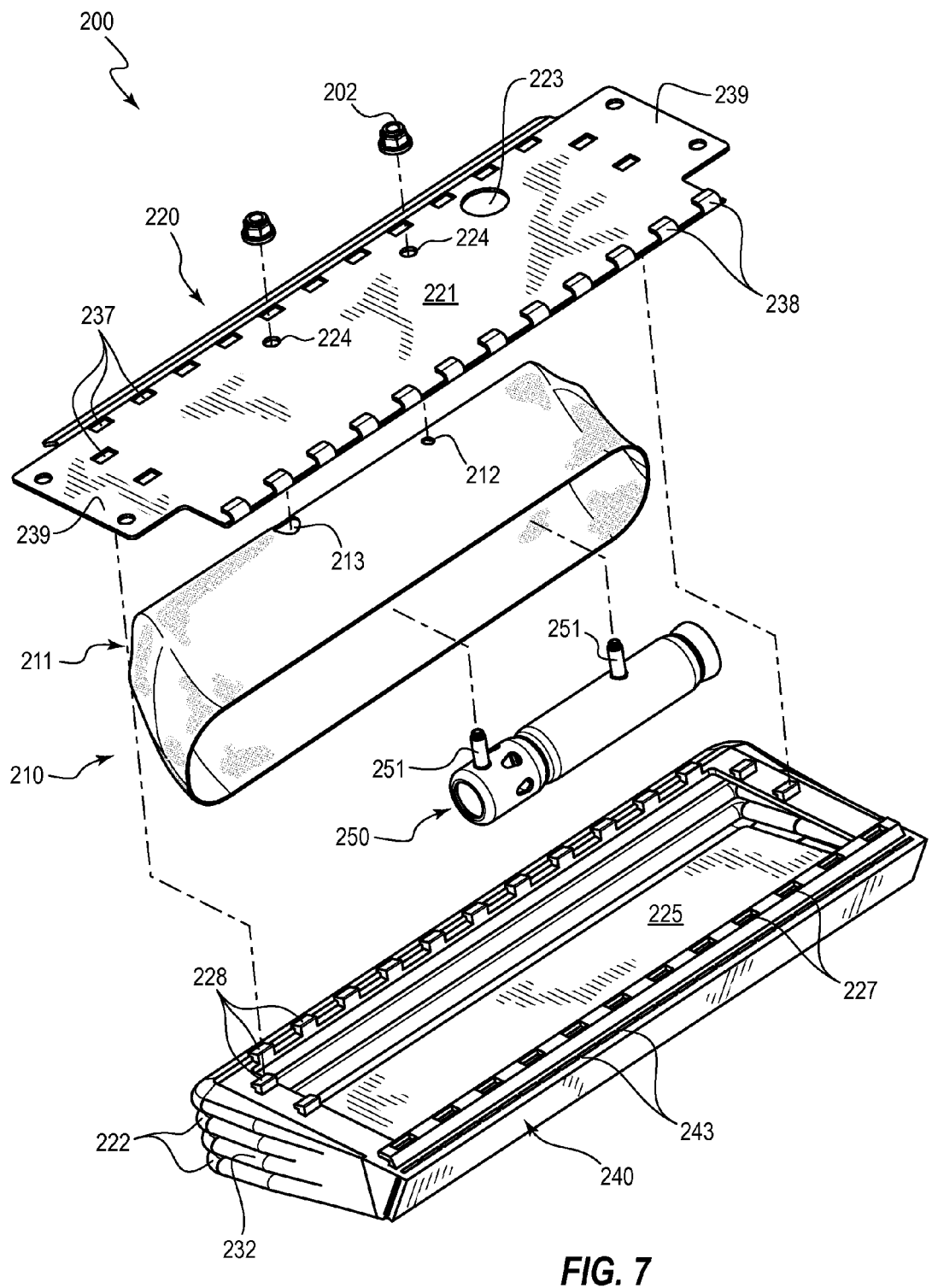
FIG. 7 is an exploded perspective view of the airbag assembly shown in FIG. 6.

FIG. 7 is an exploded perspective view of airbag assembly 200. Housing 200 comprises reaction plate 221, which may comprise inflator connecting aperture 223, a plurality of inflator mounting stem apertures 224, windows 237, hooks 238, and flanges 239. Housing 220 may also comprise car-downward portion 225, car-forward wall 222, longitudinal sidewalls 232, windows 227, hooks 228, cover 240, and perforations 243. Reaction plate 221 is configured to be coupled to car-downward portion 225 via hooks 238 of the reaction plate being received by windows 227 the car-downward portion 225. The reaction plate is configured to be further coupled to car-downward portion 225 via hooks 228 of the car-downward portion being received by windows 237 in the reaction plate.

For clarity, airbag 210 is cutaway In FIG. 7. Airbag 210 and inflator 250 are configured to be coupled together via the inflator being inserted in to an inflator insert aperture 213 of throat portion 211, such that inflator mounting stems 251 protrude through apertures 212 and 213 of the airbag. Airbag 210 and inflator 250 may be coupled to housing 220 via inflator mounting stems 251 of inflator 250 extending through apertures 224 of reaction plate 221.

Figure 8A:
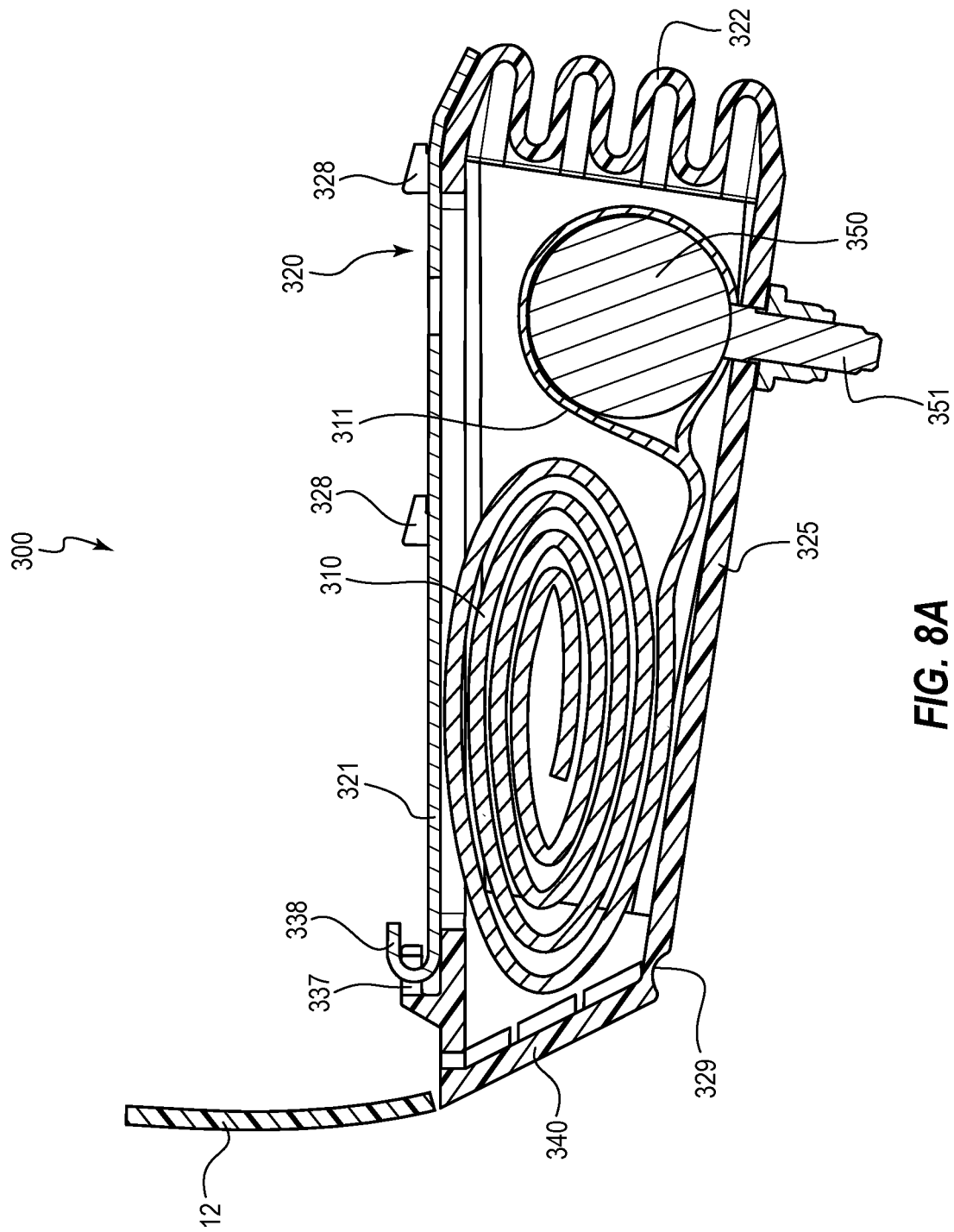
FIG. 8A is a cross-sectional view of another embodiment of an airbag assembly, wherein the assembly is in the packaged configuration.
Figure 8B:
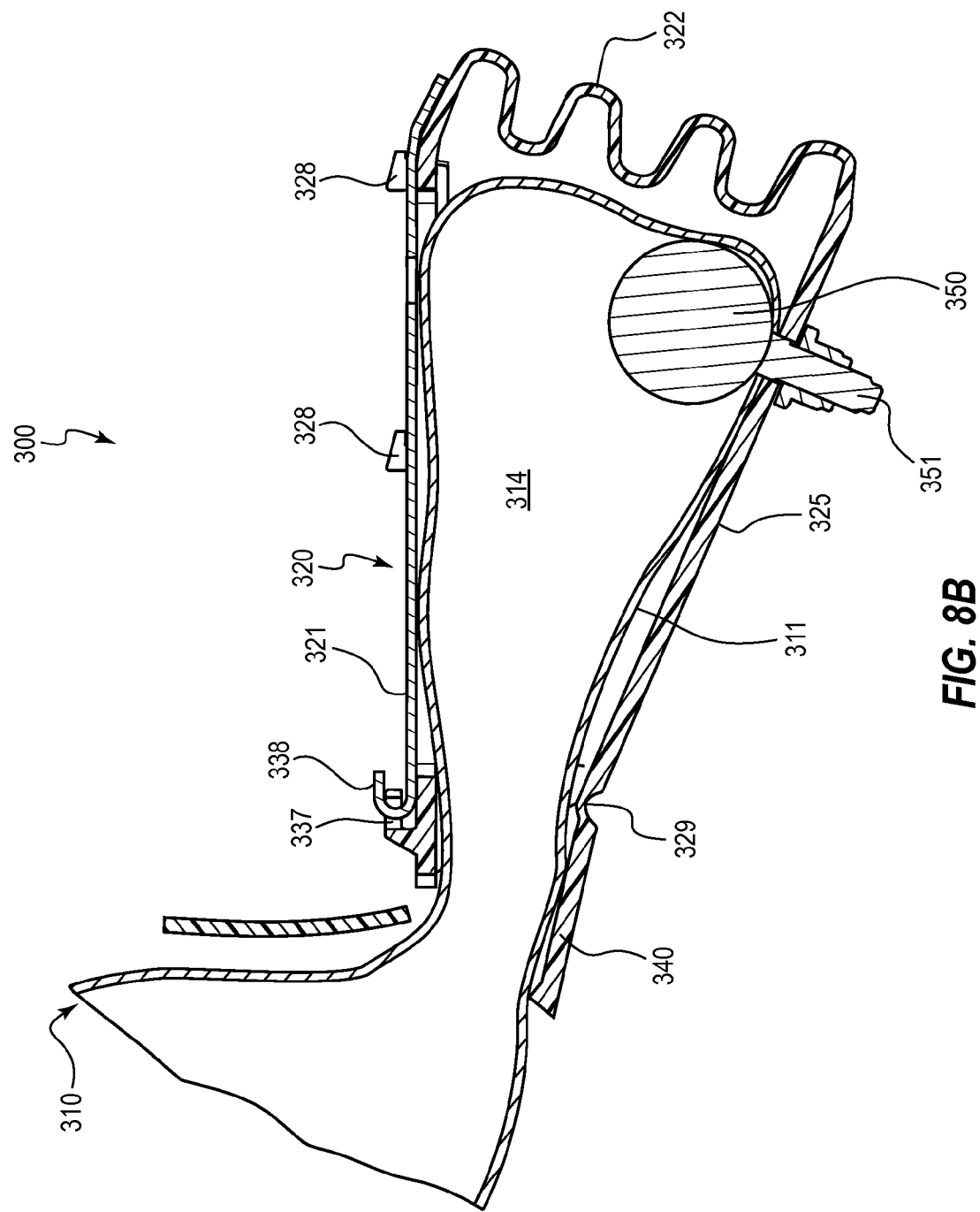
FIG. 8B is a cross-sectional view of the airbag assembly shown in FIG. 8A, wherein the assembly is in the deployed configuration.

FIGS. 8A-8B depict another embodiment of an inflatable airbag assembly 300 with an articulating housing 320, wherein assembly 300 and housing 320 resemble assemblies 100 and 200, as well as housings 120 and 220 described above, in certain respects. Accordingly, like features may be designated with like reference numerals, with the leading hundreds numeral incremented from "1" or "2" to "3". Any suitable combination of the features described with respect to assemblies 100 and/or 200 can be employed with assembly 300, and vice versa.

FIGS. 8A-8B depict cross-sectional views of airbag assembly 300. Assembly 300 is depicted in a low-mount position below knee bolster 12. Assembly 300 may comprise an inflatable airbag 310, a housing 320, a cover 340, and an inflator 350. Cover 340 may comprise an extension of housing 320, or may comprise a separate piece that is attached to housing 320. Cover 340 is configured to block the car-rearward opening of housing 320, such that airbag 310 is retained within a void of the housing.

Housing 320 may comprise a car-upward portion 321, a car-forward wall 322, a car-downward portion 325, a plurality of apertures 327, a plurality of extensions 328, and a hinge region 329. Car-upward portion 321 may comprise a reaction plate that in some embodiments may comprise a piece of metal. Reaction plate 321 may comprise a plurality of extensions 338, which are depicted as "hooks" 338. Hooks 338 are configured to be received by apertures 327, which may be called "windows". In some embodiments, an entirety of the airbag housing may comprise plastic. In the depicted embodiment, an entirety of housing 320 comprises plastic, except reaction plate 321. Car-forward wall 322 of housing 320 comprises a plurality of undulations, or ribs, which may also be described as accordion folds. Inflator 350 may be coupled to airbag 310 and car-downward portion 225 of housing 320 via at least one inflator mounting stem 351 and mounting hardware, such as a threaded nut.

In FIG. 8A, assembly 300 is in a packaged configuration, wherein housing 320 is in a contracted configuration. In FIG. 8B, assembly 300 is in the deployed and inflated configuration, wherein housing 320 is in the expanded configuration. Upon receiving electronic communication from vehicle sensors, inflator 350 may release and/or produce inflation gas into an inflatable void 314, which may begin to inflate a throat portion 311 of airbag 310. Pressure from inflation gas may act on car-downward portion 325 of housing 320, and thereby cause the car-downward portion of the housing to rotate about hinge region 329, which causes the accordion folds of car-forward wall 322 to expand. Hinge region 329 may not comprise a mechanical hinge, but rather, may comprise a living hinge. Further hinge region 320 may not comprise a specific location about which car-downward portion 325 rotates. Rather, housing 320 may generally flex at any of the car-rearward areas of the housing.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. §112 ¶ 6. It will be apparent to those having skill in the art that changes may be made to the details of the above-described embodiments without departing from the underlying principles of the invention. Embodiments of the invention in which an exclusive property or privilege is claimed are defined as follows.

The invention claimed is:

1. An inflatable knee airbag assembly comprising:
    an inflatable knee airbag;
    an inflator coupled to the inflatable knee airbag; and
    a housing coupled to the inflator, wherein in a packaged configuration, the inflatable knee airbag is contained within the housing and the housing is in a contracted configuration,
    wherein the housing comprises a car-upward portion opposite from a car-downward portion,
    wherein the housing comprises a car-forward wall opposite from a car-rearward opening,
    wherein in a deployed configuration, the car-downward portion has rotated about a hinge such that the housing is in an extended configuration, wherein the car-forward wall has a greater height in the extended configuration than in the contracted configuration,
    wherein the inflatable knee airbag exits the housing in a car-rearward direction via the car-rearward opening of the housing, and
    wherein the car-rearward opening of the housing has a height that remains the same in the deployed configuration and in the contracted configuration.

2. The inflatable airbag assembly of claim 1, wherein the hinge is located on the car-downward portion of the housing.

3. The inflatable airbag assembly of claim 1, wherein the hinge is located adjacent to the car-rearward opening of the housing.

4. The inflatable airbag assembly of claim 1, wherein the housing comprises two side portions, and wherein each of the side portions expands when transitioning from the constricted configuration to the expanded configuration.

5. The inflatable airbag assembly of claim 1, wherein the car-forward wall moves in a car-downward direction when the housing transitions from the constricted configuration to the expanded configuration.

6. The inflatable airbag assembly of claim 4, wherein the housing is configured such that pressure from inflation gas causes the inflatable knee airbag to push the car-forward portion of the car-downward portion of the housing in the car-downward direction, which enables the inflatable knee airbag to have an initial deployment trajectory in a car-upward and car-rearward direction.

7. An inflatable airbag assembly comprising:
    an inflatable airbag;
    an inflator coupled to the inflatable airbag; and
    a housing coupled to the inflator, wherein the housing comprises a car-upward portion and a car-downward portion, wherein the car-upward portion comprises a rigid reaction plate, and wherein a car-forward wall of the housing comprises a plurality of folds that permit the car-downward portion to rotate relative to the rigid reaction plate,
    wherein, when the assembly is in a packaged configuration, the airbag is contained within the housing and the housing is in a contracted configuration, and
    wherein, when the assembly transitions to a deployed configuration, the folds expand so that the housing is moved to an extended configuration, wherein a car-forward portion has a greater height in the extended configuration than in the contracted configuration.

8. The inflatable airbag assembly of claim 7, wherein the car-downward portion comprises a hinge region.

9. The inflatable airbag assembly of claim 8, wherein the housing is configured such that pressure from inflation gas acting on the airbag causes a portion of the car-downward portion to rotate about the hinge region.

10. The inflatable airbag assembly of claim 7, wherein the inflator is coupled to the car-upward portion of the housing.

11. The inflatable airbag assembly of claim 7, wherein the inflator is coupled to the car-downward portion of the housing.

12. An inflatable airbag assembly comprising:
    an inflatable airbag;
    an inflator coupled to the inflatable airbag; and
    a housing coupled to the inflator, wherein the housing comprises a car-upward portion and a car-downward portion, and wherein the car-upward portion comprises a rigid member and wherein the car-downward portion comprises a plastic member,
    wherein a car-forward wall of the housing comprises a plurality of folds,
    wherein the car-downward portion comprises a living hinge,
    wherein in a packaged configuration, the airbag is contained within the housing and the housing has a contracted configuration,
    wherein in a deployed configuration, the housing comprises an extended configuration, wherein the car-forward wall has a greater height than in the contracted configuration, and
    wherein in the deployed configuration and in the constricted configuration, a car-rearward portion has a same height.

13. The inflatable airbag assembly of claim 12, wherein the housing is configured such that inflation gas causes the inflatable airbag to apply pressure to a car-downward wall of the car-downward portion.

14. The inflatable airbag assembly of claim 13, wherein a car-forward portion of the car-downward wall rotates in a car-downward direction, such that a car-rearward portion of the car-downward portion acts as a hinge.

15. The inflatable airbag assembly of claim 12, wherein the housing comprises a plurality of sidewalls, and wherein each sidewall comprises accordion folds.

16. The inflatable airbag assembly of claim 12, wherein the inflator is coupled to the car-upward portion of the housing.

17. The inflatable airbag assembly of claim 12, wherein the inflator is coupled to the car-upward portion of the housing.

* * * * *